Patented July 29, 1941

2,250,552

UNITED STATES PATENT OFFICE 2,250,552

PROCESS FOR THE PRODUCTION OF TIN OXIDE

Ákos Pintér, Budapest, Hungary

No Drawing. Application June 8, 1939, Serial No. 278,080. In Hungary June 30, 1938

3 Claims. (Cl. 23—144)

This invention relates to a process of producing substantially pure tin oxide, i. e., stannic oxide.

A process is known for producing tin oxide, i. e., stannic oxide, in which vaporized tin sulphide is oxidised by the action of air. This process, however, in its form as used hitherto, shows many disadvantages. The tin sulphide dissociates during the vaporisation and in consequence thereof unvaporisable residues are formed in the vaporisation-vessel. It was therefore necessary to discharge from time to time these unvaporisable residues from the evaporation-vessel; the production process is thereby hindered and a continuous production is made impossible by this discharging.

The mentioned disadvantages are avoided in accordance with the present invention by producing substantially pure tin oxide by a process comprising the steps of reacting in a reaction chamber substantially pure metallic tin with sulphur vapor while maintaining in said vessel a quantity of sulphur vapor in excess of that reacting with said metallic tin, converting thereby said metallic tin without residue into tin sulphide vapor, and oxidizing thereafter said tin sulphide vapor in air in a separate reaction chamber to substantially pure stannic oxide, thus causing complete conversion of the metallic tin used into stannic oxide. The dissociation of the tin sulphide is thereby avoided and by constant and equal evaporation a continuously working process is made possible.

According to a preferred embodiment of the invention it is herewith proposed to submit the metallic tin in molten and finely disintegrated condition to the action of the sulphur vapour.

The process according to the invention is preferably carried out by injecting a stream of molten and finely disintegrated metallic tin, for instance, finely divided tin powder, e. g., by means of a nozzle or a sieve, into a heated reaction-chamber, filled with sulphur vapor in excess. As the result of heating by exothermic reaction and of heating the reaction-chamber from outside, the tin sulphide becomes vaporized and passes in unchanged condition through a conduit into a neighbouring separate reaction-chamber, where it is oxidized in presence of air to substantially pure tin oxide, i. e., stannic oxide.

I claim:

1. Process of producing substantially pure stannic oxide comprising the steps of reacting in a reaction chamber substantially pure metallic tin with sulphur vapor while maintaining in said vessel a quantity of sulphur vapor in excess of that reacting with said metallic tin, converting thereby said metallic tin without residue into tin sulphide vapor, and oxidizing thereafter said tin sulphide vapor in air in a separate reaction chamber to substantially pure stannic oxide, thus causing complete conversion of the metallic tin used into stannic oxide.

2. Process of producing substantially pure stannic oxide comprising the steps of reacting in a reaction chamber substantially pure molten and finely disintegrated metallic tin with sulphur vapor in excess of that reacting with said metallic tin, converting thereby said metallic tin without residue into tin sulphide vapor, and oxidizing thereafter said tin sulphide vapor in air in a separate reaction chamber to substantially pure stannic oxide, thus causing complete conversion of the metallic tin used into stannic oxide.

3. Process of producing substantially pure stannic oxide comprising the steps of injecting into a reaction chamber a stream of finely divided tin powder, said reaction chamber being filled with sulphur vapor, reacting thereby said injected tin powder with said sulphur vapor while maintaining in said vessel a quantity of sulphur vapor in excess of that reacting with said metallic tin, converting thereby said metallic tin without residue into tin sulphide vapor, and oxidizing thereafter said tin sulphide vapor in air in a separate reaction chamber to substantially pure stannic oxide, thus causing complete conversion of the metallic tin used into stannic oxide.

ÁKOS PINTÉR.